United States Patent
Goto (10) Patent No.: US 8,605,320 B2
(45) Date of Patent: Dec. 10, 2013

(54) METHOD FOR SETTING STORAGE TIME FOR PRINT JOBS AND MEMORY MANAGEMENT IN PRINTING APPARATUS

(75) Inventor: Keigo Goto, Yatomi (JP)

(73) Assignee: Brother Kogyo Kabushiki Kaisha, Nayoya-shi, Aichi-ken (JP)

( * ) Notice: Subject to any disclaimer, the term of this patent is extended or adjusted under 35 U.S.C. 154(b) by 257 days.

(21) Appl. No.: 13/242,824

(22) Filed: Sep. 23, 2011

(65) Prior Publication Data

US 2012/0107030 A1    May 3, 2012

(30) Foreign Application Priority Data

Nov. 2, 2010  (JP) ................................ 2010-246000

(51) Int. Cl.
*G06F 3/12* (2006.01)
*H04N 1/00* (2006.01)

(52) U.S. Cl.
USPC ......... 358/1.16; 358/1.15; 358/403; 358/404; 358/426.05

(58) Field of Classification Search
None
See application file for complete search history.

(56) References Cited

U.S. PATENT DOCUMENTS

| | | | |
|---|---|---|---|
| 6,932,523 B1 | 8/2005 | Yamada et al. | |
| 2009/0219562 A1* | 9/2009 | Hasegawa | 358/1.15 |

FOREIGN PATENT DOCUMENTS

| | | |
|---|---|---|
| JP | 11-27448 | 1/1999 |
| JP | 2001-63158 | 3/2001 |
| JP | 2005-193408 | 7/2005 |
| JP | 2006-146665 | 6/2006 |
| JP | 2006-244372 | 9/2006 |

* cited by examiner

*Primary Examiner* — Benny Q Tieu
*Assistant Examiner* — Haris Sabah
(74) *Attorney, Agent, or Firm* — Scully, Scott, Murphy & Presser, PC (57) ABSTRACT

A printing apparatus includes: a receiving section which receives a print data from the external apparatus; a storage section in which the print data received by the receiving section is stored; an input section which receives from a user a print instruction for printing based on the print data stored in the storage section; a print section which performs the printing of the image on the recording medium based on the print data stored in the storage section in a case that the input section receives the print instruction from the user; and a controller which controls the storage section and which calculates and sets for the print data stored in the storage section a storage time-period within which the print data is storable in the storage section.

10 Claims, 8 Drawing Sheets

NON-CONFIDENTIAL PRINT DATA
- IMAGE DATA
- ATTRIBUTE DATA

Fig. 4B

CONFIDENTIAL PRINT DATA
- IMAGE DATA
- ATTRIBUTE DATA
- ADDITIONAL INFORMATION DATA

Fig. 4C

ATTRIBUTE DATA

| DATA NAME | pic.jpg. |
|---|---|
| DATA AMOUNT | 15KB |
| IMPORTANCE | medium |
| DATA TYPE | confidential |
| RECEIVE TIME | 11:25 |
| ELAPSED TIME | 100 m |

Fig. 4D

ADDITIONAL INFORMATION DATA

| DATA NAME | pic.jpg. |
|---|---|
| USER ID | user A |
| PASSWORD | **** |
| STORAGE TIME-PERIOD | not set |

| JOB | DATA AMOUNT (KB) | IMPORTANCE | ELAPSED TIME (m) |
|---|---|---|---|
| Job1 | 200 | LOW | 600 |
| Job2 | 50 | HIGH | 480 |
| Job3 | 80 | MEDIUM | 300 |
| Job4 | 2000 | LOW | 120 |
| Job5 | 150 | HIGH | 60 |

Fig. 6B

| JOB | DATA AMOUNT (KB) | INTERMEDIATE STORAGE TIME-PERIOD T1 (m) | CALCULATION FORMULA |
|---|---|---|---|
| Job1 | 200 | -20 | 180(m)-10(m)*(200/10(KB)) |
| Job2 | 50 | 130 | 180(m)-10(m)*(50/10(KB)) |
| Job3 | 80 | 100 | 180(m)-10(m)*(80/10(KB)) |
| Job4 | 2000 | -60(-1820) | 180(m)-10(m)*(2000/10(KB)) |
| Job5 | 150 | 30 | 180(m)-10(m)*(150/10(KB)) |

Fig. 6C

| JOB | ELAPSED TIME (m) | INTERMEDIATE STORAGE TIME-PERIOD T2 (m) |
|---|---|---|
| Job1 | 600 | 30 |
| Job2 | 480 | 60 |
| Job3 | 300 | 90 |
| Job4 | 120 | 120 |
| Job5 | 60 | 150 |

Fig. 6D

| JOB | IMPORTANCE / WEIGHT | FINAL STORAGE TIME-PERIOD T3 (m) | CALCULATION FORMULA |
|---|---|---|---|
| Job1 | LOW/0.5 | 30(5) | (-20+30)*0.5 |
| Job2 | HIGH/1.2 | 230(228) | (130+60)*1.2 |
| Job3 | MEDIUM/1.0 | 190 | (100+90)*1.0 |
| Job4 | LOW/0.5 | 30 | (-60+120)*0.5 |
| Job5 | HIGH/1.2 | 220(216) | (30+150)*1.2 |

METHOD FOR SETTING STORAGE TIME FOR PRINT JOBS AND MEMORY MANAGEMENT IN PRINTING APPARATUS

CROSS REFERENCE TO RELATED APPLICATION

The present application claims priority from Japanese Patent Application No. 2010-246000 filed on Nov. 2, 2010 the disclosure of which is incorporated herein by reference in its entirety.

BACKGROUND OF THE INVENTION

1. Field of the Invention

The present invention relates to a printing apparatus, and more specifically to a printing apparatus provided with a confidential printing function including secure print.

2. Description of the Related Art

For example, a network printer described in U.S. Pat. No. 6,932,523 (corresponding to Japanese Patent Application Laid-open No. 2001-63158) receives a print data from a host apparatus via a network, and then spools the print data in a spool area in a memory (storage section), and adds data sizes of the respective pieces of data in the spool area to calculate the total data size (entire data size) of the pieces of print data. In a case that the total data size exceeds a pre-set reference data size, the network printer reads out a spool-date information included in a print management information and deletes a print data, among the spooled pieces of print data, which has been spooled earliest (oldest spooled data) from the spool area.

According to the network printer described in U.S. Pat. No. 6,932,523, in a case that the total data size of the respective pieces of print data in the spool area exceeds the reference data size, namely in a case that a free space (free capacity) of the spool area becomes less than a certain reference value, the earliest spooled data is deleted from the spool area and the free capacity is increased by an amount corresponding to the size of the deleted earliest spooled data. Note that, however, if the size of a print data which is newly received is small such that the current free capacity of the spool area is sufficient for storing the newly received print data, then there is no need to delete the earliest spooled print data. Nevertheless, the network printer described in U.S. Pat. No. 6,932,523, the earliest spooled print data is deleted. Therefore, in a case that this print data is to be printed again, the print data needs to be transmitted again, which is not suitable for a user.

The present teaching has been made so as to solve the above-mentioned problem, an object of which is to provide a printing apparatus capable of storing received pieces of print data as much as possible and/or as long as possible.

SUMMARY OF THE INVENTION

According to an embodiment of the present teaching, there is provided a printing apparatus which is connected to an external apparatus and which performs printing of an image on a recording medium, the printing apparatus including:

a receiving section which receives a print data from the external apparatus;

a storage section in which the print data received by the receiving section is stored;

an input section which receives a print instruction from a user for printing based on the print data stored in the storage section;

a print section which performs the printing of the image on the recording medium based on the print data stored in the storage section in a case that the input section receives the print instruction from the user; and a controller which controls the storage section and which calculates and sets for the print data stored in the storage section a storage time-period within which the print data is storable in the storage section;

wherein: under the condition that the receiving section receives the print data, the controller calculates a free capacity of the storage section;

in a case that the free capacity of the storage section is less than a predetermined reference value, the controller calculates and sets the storage time-period for first print data which is stored in the storage section and for which the storage time-period has not been set; and in a case that the storage time-period set for the first print data has elapsed, the controller controls the storage section to delete the first print data stored in the storage section from the storage section.

According to the printing apparatus, the storage time-period is set for the print data which is stored in the storage section and for which the storage time-period has not been set in a case that the free capacity of the storage area is less than the reference value. Further, the print data stored in the storage section is not deleted until the storage time-period set for the print data elapses. Accordingly, it is possible to store the print data in the storage section for a longer period of time than the conventional technique. Further, since a print data for which printing has not been performed even after elapse or expiration of the storage time-period is deleted from the storage section, it is possible to decrease the burden on the storage section which would have been caused due to the storage of any print data having the elapsed storage time-period and stored in the storage section without being printed.

DESCRIPTION OF THE PREFERRED EMBODIMENTS

In the following, an embodiment of the present teaching will be explained with reference to the drawings.

Figure 1:
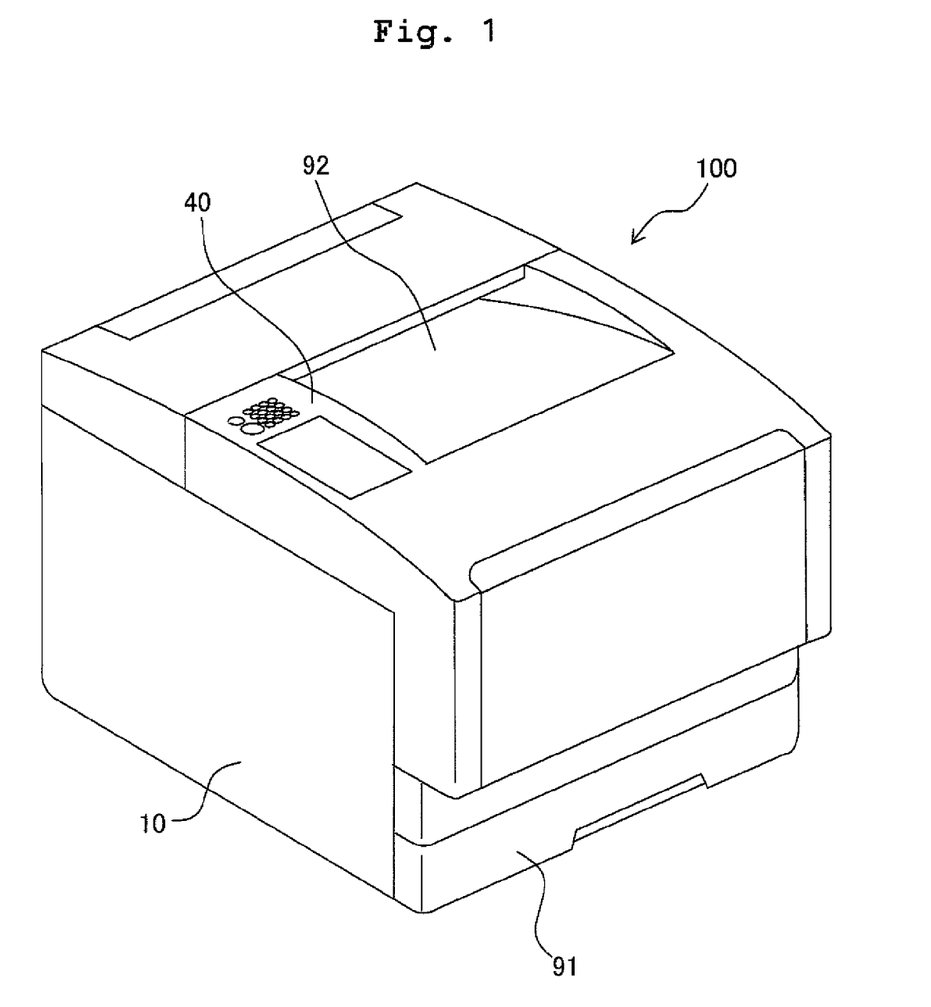
FIG. 1 is a perspective view showing a schematic construction of a printer according to an embodiment of the present teaching.

As shown in FIG. 1, a printer 100 (printing apparatus) according to an embodiment of the present teaching is provided with an image forming section 10 (print section) which forms an image on a paper sheet or a sheet (recording medium). Further, an operation panel 40 (input section) which has a display section constructed of a liquid crystal display, a button groups constructed of a start key, a stop key, a ten-key (numeric key), etc., is provided at a position above or over the image forming section 10. Via the operational panel 40, it is possible to display operation state and to enable input operation by the user.

Figure 2:
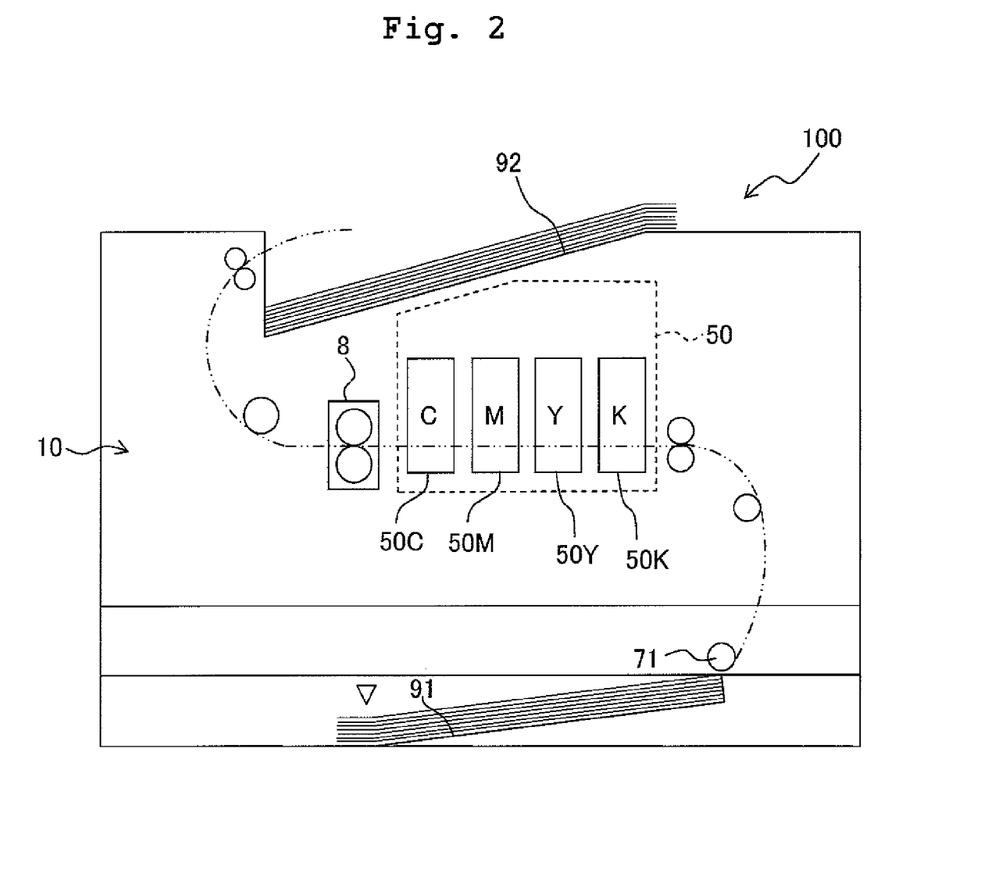
FIG. 2 is a conceptual view illustrating internal construction of an image forming section in the printer shown in FIG. 1.

As shown in FIG. 2, the image forming section 10 is provided with a process section 50 which forms an image of a toner (toner image) and transfers the toner image to a paper sheet; a fixing device 8 which fixes, to the paper sheet, an un-fixed tonner which is not fixed on the paper sheet; a paper feed tray 91 on which paper sheets before an image is formed thereon are placed; and a paper discharge tray 92 on which paper sheets having the image formed thereon are placed.

The image forming section 10 picks the paper sheets placed on the paper feed tray 91 one by one with a paper feed roller 71, transports the paper sheet to the process section 50, transfers a toner image formed in the process section 50 to the paper sheet. After that, the image forming section 10 transports the paper sheet to which the toner image has been transferred to the fixing device 8, and causes the toner image to be thermally fixed to the paper sheet. After that, the image forming section 10 discharges, to the paper discharge tray 92, the paper sheet after the toner image has been fixed thereto.

Process units corresponding to the respective colors of yellow (Y), magenta (M), cyan (C) and black (K) are arranged in the process section 50. Note that the process section 50 forms a color image by overlapping toner images, formed in the process units 50C, 50M, 50Y and 50K, respectively, on the paper sheet. On the other hand, when forming a monochrome image, a toner image is formed by using only the process unit 50K to perform printing.

Figure 3:
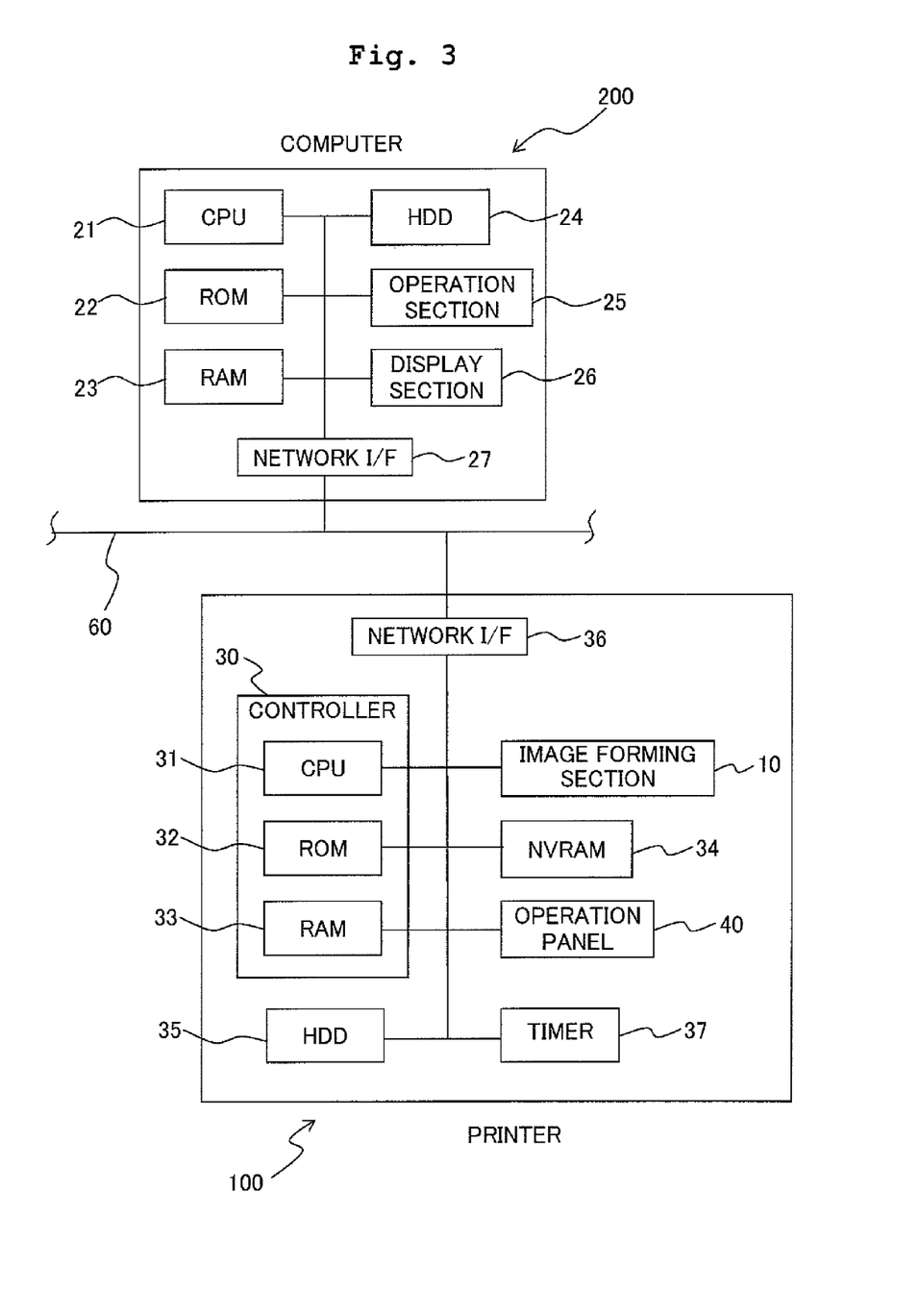
FIG. 3 is a block diagram showing electric configuration of the printer shown in FIG. 1 and a computer.

Next, the electrical configuration of the printer 100 will be explained. As shown in FIG. 3, the printer 100 includes a controller 30 provided with a CPU 31, a ROM 32 and a RAM 33; a NVRAM (non-volatile RAM) 34; a hard disk drive (HDD) 35; a network interface 36 (receiving section); and a timer 37. Further, the controller 30 is electrically connected to the image forming section 10, the operation panel 40, etc.

The ROM 32 stores a variety of kinds of control programs for controlling the printer 100, a variety of kinds of settings, initial values, etc.

The RAM 33 is used as an operation area for performing an operation for reading out the variety of kinds of control programs, for temporarily storing a print data, for performing an operation for analyzing a print data written in PDL (page description language) and expanding the print data into a bit map image, etc.

The HDD 35 has a storage area of a very large capacity, and is utilized as a storage section storing a confidential print data which will be described later on.

The CPU 31 controls the respective constitutive parts or components of the printer 100 in accordance with the control programs read out from the ROM 32 and/or signals transmitted from the various sensors, while storing the result of processing in the RAM 33 or VRAM 34 store.

The network interface 36 is connected to a communication line 60 such as a LAN and enables connection with respect to an external apparatus such as a computer 200 (to be described later on) into which a driver for the printer 100 is installed. The printer 100 is capable of performing exchange of print data including the confidential print data (to be described later on) via the network interface 36.

The timer 37 keeps time.

Next, the electrical configuration of the computer 200 will be explained. The computer 200 is connected to the printer 100 via the communication line 60.

As shown in FIG. 3, the computer 200 includes a CPU 21; a ROM 22; a RAM 23; a hard disk drive (HDD) 24; an operation section 25 constructed of a keyboard, a pointing device, etc.; a display section 26 constructed of a display, etc.; a network interface 27; and the like. The hard disk drive 24 stores a variety of kinds of programs such as application software for preparing a print data for printing, a printer driver for generating the print data, etc. Further, the network interface 27 is connected to the external printer 100, etc., via the communication line 60 such as LAN, and is capable of performing mutual data communication.

Next, an explanation will be given about the construction of print data including a non-confidential print data and a confidential print data handled in the embodiment, with reference to FIGS. 4A to 4D. Here, the term "confidential print data" means a print data for which a user ID and a password are designated, which is received by the printer 100 and then is stored in the HDD 35, and which is printed only at a stage that the user ID and the password are verified (authenticated) in the printer 100. Further, the term "non-confidential print data" means a print data which is included in the print data but is different from the confidential print data. The non-confidential print data is printed immediately after the non-confidential print data has been received by the printer 100.

Figure 4A:
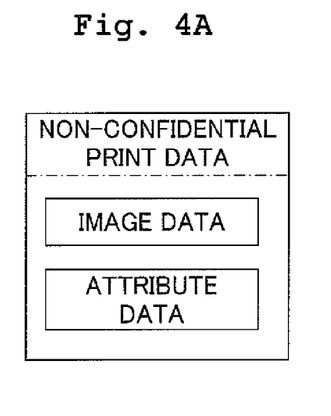
FIGS. 4A to 4D are drawings showing construction of print data according to the embodiment of the present teaching.
Figure 4B:
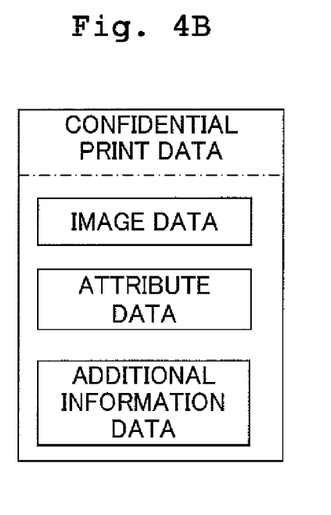

As shown in FIG. 4A, the non-confidential print data includes an image data and an attribute data. On the other hand, as shown in FIG. 4B, the confidential print data handled in the embodiment is constructed of an image data, an attribute data and an additional information data.

The image data is a data regarding a text (document), an image (picture), etc., which is to be printed on a paper sheet by the printer 100.

Figure 4C:
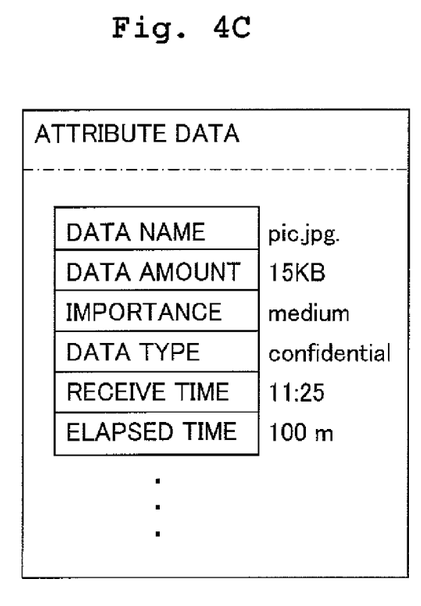

The attribute data includes, as shown in FIG. 4C, a variety kinds of data such as a print setting including a data name of the print data, a data amount of the print data, importance of the print data, a data type of the print data; a receive time; and an elapsed time.

The data amount indicates a data size of the print data.

The print setting is an information indicating a variety of kinds of printing conditions inputted by the user via the operation panel 25 in the computer 200. The printing conditions which can be set herein include, for example, setting items such as the importance of the print data, the data type of the print data, etc.

The importance of the print data is a setting item indicating priority of printing an image data over other print data. The image data are printed sequentially by the image forming section 10 in descending order of high importance, with a print data having the highest importance being printed first.

The data type is a setting item for setting whether a print data is non-confidential print data or confidential print data (to be described later on).

The receive time is a point of time at which the printer 100 receives a print data (may includes information regarding year, day and time), and the receive time is measured by the timer 37.

The elapsed time indicates a period of time (duration of time) during which a print data is being stored in the storage section. In other words, the elapsed time indicates a period of time which has elapsed (passed) since the receipt of the print data by the printer 100 up to present. The elapsed time is obtained by subtracting the receive time from the present time measured by the timer 37, and is constantly updated or renewed.

Figure 4D:
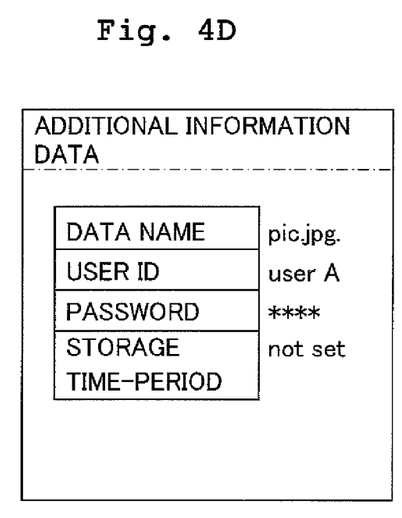

The additional information data is a data relating to a data name of the confidential print data, the user ID, the password, and the storage time-period for the confidential print data, as shown in FIG. 4D.

The storage time-period is a period of time after the receipt of the confidential print data during which the confidential print data can be stored in the HDD 35. The printer 100 performs a deleting operation to delete the confidential print data based on the storage time-period. Note that the storage time-period is a data which is set by the printer 100 if a predetermined condition is satisfied. Accordingly, before the storage time-period is set by the printer 100, a setting as an initial state regarding the storage time-period for a received confidential print data is made as "not set".

Figure 5A:
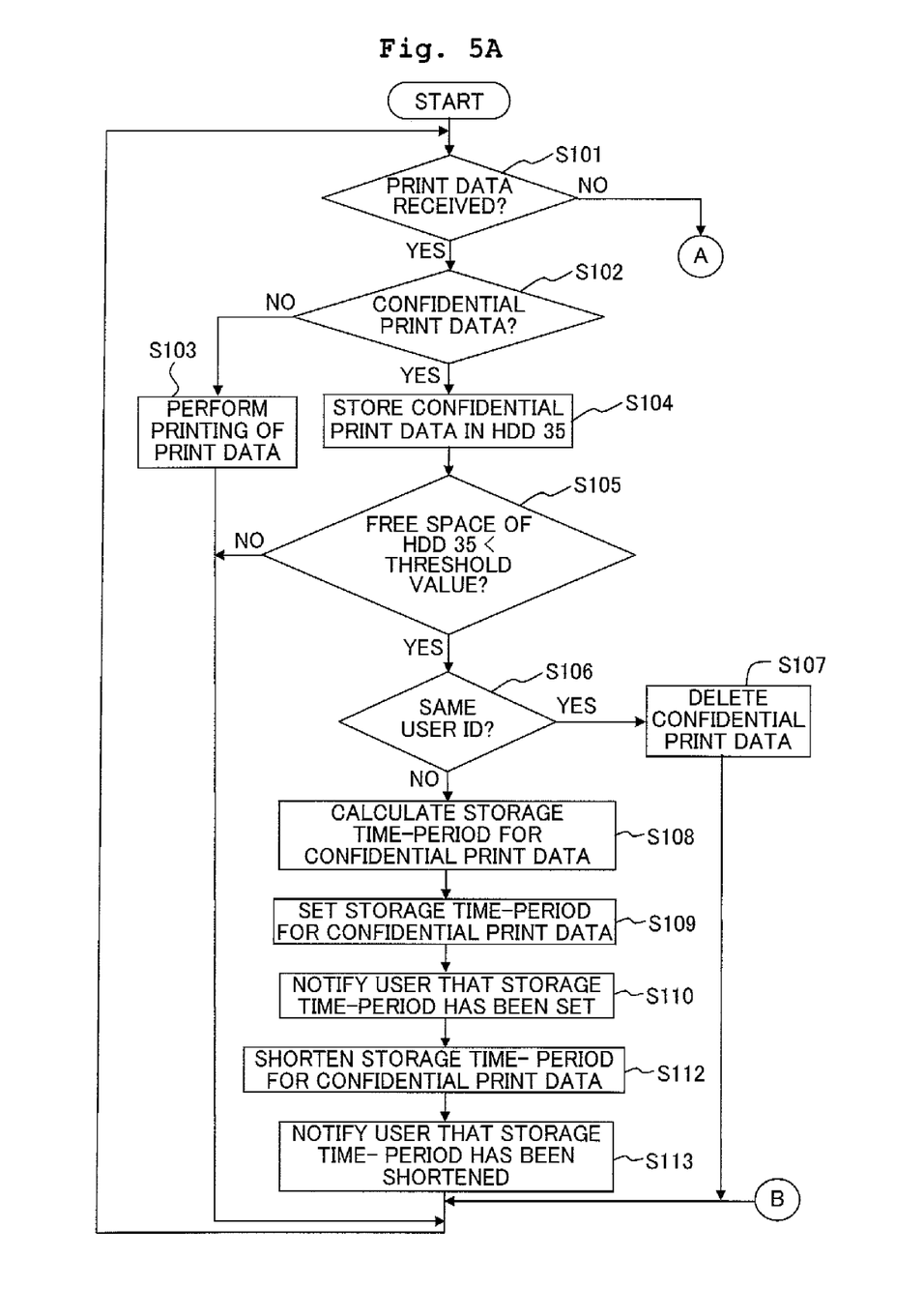
FIGS. 5A and 5B are a flow chart showing a print controlling procedure according to the embodiment of the present teaching.
Figure 5B:
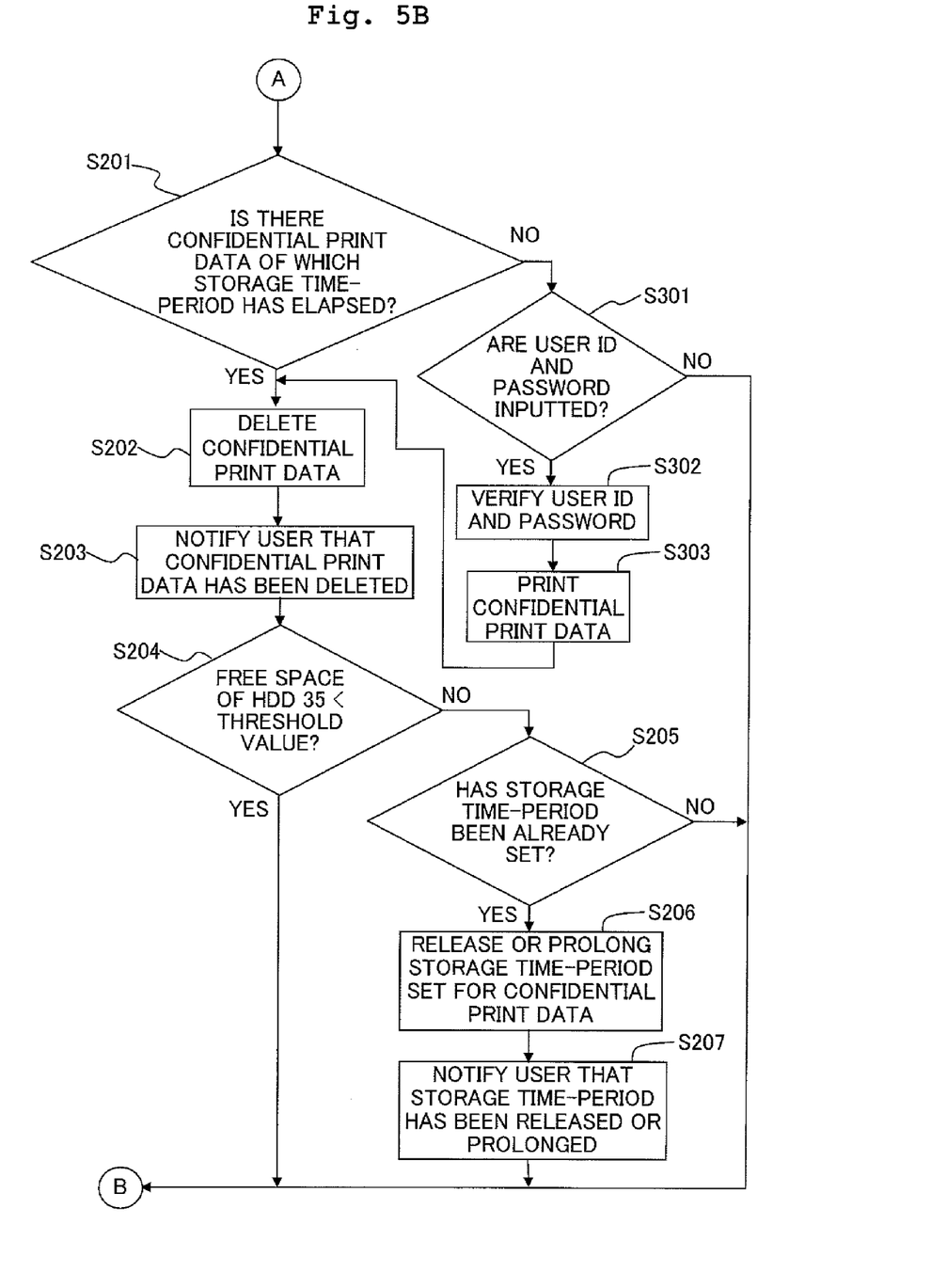

Next, an explanation will be given about a print controlling procedure, with reference to FIGS. 5A and 5B. As shown in FIGS. 5A and 5B, at first, the printer 100 assumes a stand-by state when the power is switched on.

The CPU 31 judges whether or not a print data is received via the communication line 60 such as LAN (S101). In a case that judgment is made that the print data is received (S101: YES), then the print data is once stored in the RAM 33.

Then, the CPU 31 judges whether or not the print data is a confidential print data (S102). Here, the CPU 31 makes the judgment based on a data type in the above-described print setting of the attribute data of the print data.

In a case that the print data is not a confidential print data (S102: NO), then the print data is printed by the image forming section 10. More specifically, the CPU 31 analyzes the print data described in the PDL, and expands an image data of the print data to a bit map image based on the print setting of the attribute data. Then, the expanded bit map image is printed on a paper sheet (S103). After printing the image data, the CPU 31 deletes the print data including the image data from the RAM 33, and returns to the stand-by state.

On the other hand, in a case that the CPU 31 judges that the print data is a confidential print data (S102:YES), the CPU 31 causes the confidential print data to be moved from the RAM 33 to the HDD 35 and to be stored (S104).

Next, the CPU 31 judges whether or not there is a sufficient free space (free capacity) in the HDD 35 (S105). Here, the CPU 31 may directly calculate the free space of the HDD 35. Alternatively, it is allowable that the CPU 31 calculates the free space of the HDD 35 by calculating the total data size(s) of the stored confidential print data and subtracting the total data size from the total space (total capacity) of the HDD 35. Note that when calculating the total data size with respect to the respective image data, the data size of the attribute data of each of the confidential print data is read out. The variable for storing the calculated free space in the storage area is prepared in the RAM 33 or the NVRAM 34; and the variable is updated as calculated free space of the storage area.

In a case that the free space of the HDD 35 is not less than a pre-set threshold value N (S105: NO), the CPU 31 returns to the stand-by state, and the confidential print data is not printed until the user ID and the password are inputted by the user via the operation panel 40 of the printer 100 as a print instruction. Note that it is allowable to determine, as the threshold value N, a predetermined ratio to the total space of the HDD 35 with a sufficient margin or allowance, and a value set by a user may be determined as the threshold value N.

On the other hand, in a case that the free space of the HDD 35 is less than the pre-set threshold value N (S105: YES), the CPU 31 judges whether or not there is any confidential print data, which is transmitted by the user who transmitted the newly received confidential print data and for which the above-described storage time-period has been set (namely, the data regarding the storage time-period is not the initial state of "not set" but is set with a specific time; this applies also for the following explanation), based on the additional information data (S106).

In a case that the CPU 31 judges that the newly received confidential print data and the stored confidential print data, among the pieces of confidential print data already stored in the HDD 35, for which the storage time-period has been set, are transmitted by a same user (S106: YES), the CPU 31 causes the newly received confidential print data to be deleted from the HDD 35 as a penalty processing (S107).

On the other hand, in a case that there is no confidential print data, which is transmitted by the user who transmitted the newly received confidential print data, in the HDD 35, or in a case that the storage time-period has not been set for any confidential print data, which is transmitted by the user who transmitted the newly received confidential print data (namely, the data regarding the storage time-period is in the initial state of "not set"; this applies also for the following explanation) (S106: NO), then the CPU 31 calculates, with respect to respective confidential print data which are included in a plurality of pieces of confidential print data stored in the HDD 35 and for which the storage time-period has not been set yet, a storage time-period within which the confidential print data can be stored in the HDD 35, based on the attribution data of the respective confidential print data (S108). The details of this setting will be described in "Calculation of the storage time-period" to be described later on.

Next, the calculated storage time-period is set for the respective confidential print data (S109). More specifically, the value of the calculated storage time-period is written in the data regarding the storage time-period included in the additional information data of each of the confidential print data.

Afterwards, the CPU 31 notifies the computer 200, from which the confidential print data was transmitted previously, that the storage time-periods has been set for the confidential print data (S110), and the CPU 31 returns to the stand-by state. Here, the CPU 31 reads out the user ID from the additional information data, and notifies the computer 200 which has been previously memorized as being corresponding to the user ID. The CPU 21 of the computer 200 causes the display section 26 to show that the notification has been made.

Next, the CPU 31 shortens the storage time-period with respect to the confidential print data (or pieces of confidential print data), for which the storage time-period has been already set (except for a confidential print data for which the storage time-period is newly set in S109), by a predetermined period of time (S112), and the CPU 31 makes the shortening of the storage time-period be notified to the computer 200 (S113). The CPU 21 of the computer 200 causes the display section 26 to show that the notification has been made.

In a case that the CPU 31 judges that any print data has not been received in S101 (S101: NO), the CPU 31 judges whether or not there is any confidential print data which is not printed yet even after the storage time-period set for the confidential print data in S109 has elapsed (S201). More specifically, with respect to each of the confidential print data stored in the HDD 35, the CPU 31 obtains the current elapsed time from the attribute data and obtains the storage time-period from the additional information data, and the CPU 31 compares the elapsed time with the storage time-period. Further, in a case that the elapsed time is longer than the storage time-period for a certain confidential print data, the CPU 31 judges that the certain confidential print data has not been subjected to printing even though the storage time-period elapsed.

When the CPU 31 judges that there is a confidential print data which is not printed yet even after the storage time-period set for the confidential print data in S109 has elapsed (S201: YES), the CPU 31 deletes such confidential print data from the HDD 35 (S202). Here, if this confidential print data is being printed, then it is allowable to delete the confidential print data after completion of the printing.

Afterwards, the CPU 31 notifies the computer 200 that the confidential print data has been deleted (S203). The CPU 21 of the computer 200 causes the display section 26 to show that the notification has been made.

Next, since the free space of the HDD 35 is changed due to the deletion of the confidential print data, the CPU 31 again judges whether or not there is sufficient free space in the HDD 35 (S204).

In a case that it is judged that the free space of the HDD 35 is less than the threshold value N (S204: YES), namely it is judged that the free space in the HDD 35 is not sufficient with respect to the total space of the HDD 35 even though the free space is increased by the deletion of the confidential print data, the storage time-period which has been already set for the confidential print data is maintained as it is and the confidential print data for which the storage time-period has not been set is stored as it is, and the CPU 31 returns to the stand-by mode.

On the other hand, in a case that it is judged that the free space of the HDD 35 is not less than the threshold value N (S204: NO), the CPU 31 changes, with respect to the confidential print data which is included in the pieces confidential print data stored in the HDD 35 and for which the storage time-period has been already set (S205: YES), the data regarding the storage time-period, in the additional information data of the respective confidential print data, back to the initial state of "not set" so as to release or cancel the set storage time-period (S206).

In this case, it is also allowable to prolong the storage time-period, already set for the confidential print data, for a predetermined period of time set in advance, instead of releasing the storage time-period.

Afterwards, the CPU 31 notifies the computer 200 that the storage time-period set for the confidential print data has been released or prolonged (S206), and the CPU 31 returns to the stand-by state. The CPU 21 of the computer 200 causes the display section 26 to show that the notification has been made.

On the other hand, the CPU 31 stores a confidential print data, among the pieces of the confidential print data stored in the HDD 35, for which the storage time-period has not been set (S205: NO), as it is, and the CPU 31 returns to the stand-by state.

In a case that the CPU 31 judges that any print data is not received in S101 (S101: NO) and that there is not any confidential print data for which any printing has not been performed even after the elapse of the storage time-period set in S109 (S201: NO), the CPU 31 judges whether or not there is any input of the user ID and the password by the user via the operational panel 40 of the printer 100 (S301). In a case that there is no input of the user ID and the password (S301: NO), the CPU 31 returns to the stand-by state.

On the other hand, in a case that the CPU 31 judges that there is input of the user ID and the password by the user via the operational panel 40 of the printer 100 (S301: YES), the CPU 31 verifies the inputted user ID and password based on the additional information data of the respective confidential print data stored in the HDD 35 (S302), and performs printing for the corresponding image data with the image forming section 10 (S303).

Afterwards, the CPU 31 deletes the confidential print data for which the printing has been completed from the HDD 35 (S202), sequentially performs the above-described processes (operations) in S203 to S207, and then returns to the stand-by state.

Next, the calculation process of the storage time-period will be explained with reference to FIGS. 6A to 6D. FIGS. 6A to 6D are diagrams (tables) showing an example of calculating the storage time-period within which the respective confidential print data are to be stored in the HDD 35, based on the attribute data of the respective confidential print data, in S108 shown in FIG. 5A. Note that the term "storage time-period" means a period of time after the receipt of the confidential print data during which the confidential print data can be stored in the HDD 35.

Figure 6A:
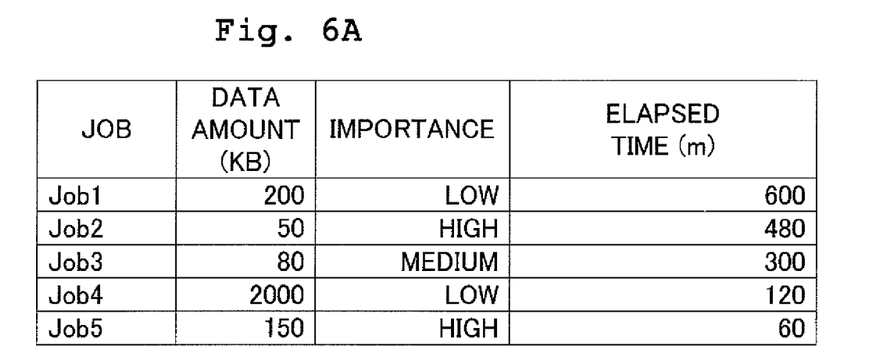
FIGS. 6A to 6D are tables showing an example of calculating a storage time-period according to the embodiment of the present teaching.
Figure 6B:
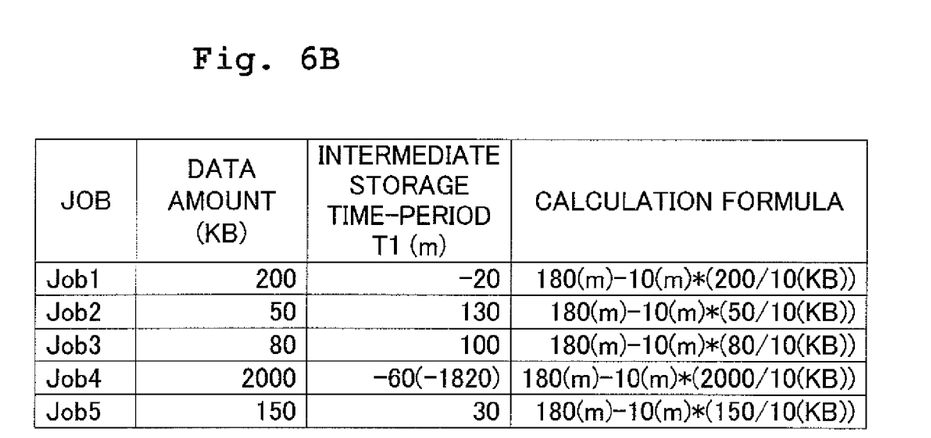
Figure 6C:
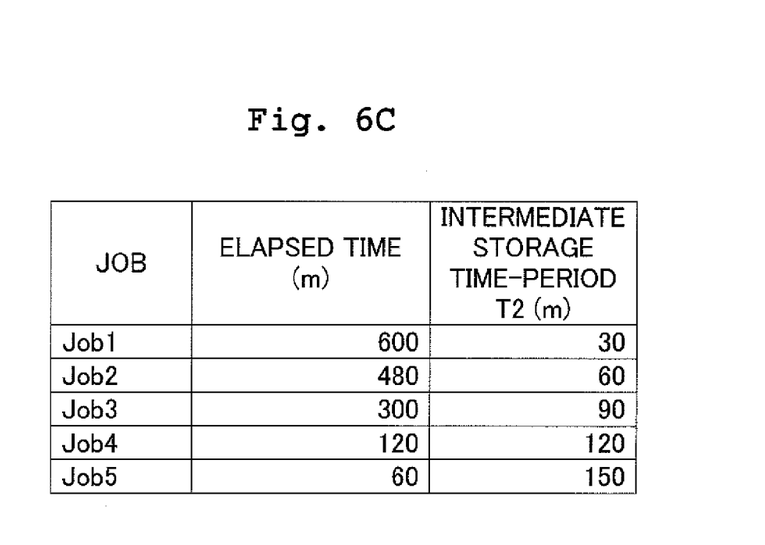
Figure 6D:
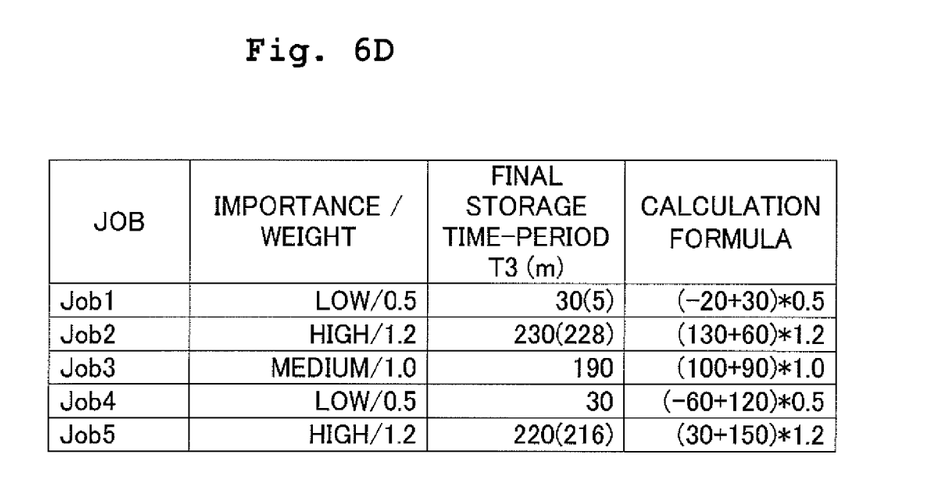

FIG. 6A is a table showing pieces of attribute data for five pieces of confidential print data currently stored in the HDD 35. FIGS. 6B to 6D show examples of calculating the storage time-period based on a condition in which data amount (data size), importance and elapsed time of the confidential print data are combined. Specifically, the storage time-period is calculated in the following calculating method.

First, an intermediate storage time-period T1 is calculated for each of the respective confidential print data based on the data amount thereof. The intermediate storage time-period T1 is calculated by subtracting, from the maximum value of the intermediate storage time-period T1, a period of time (duration of time) proportional to the data amount of the confidential print data. Namely, as the data amount of the confidential print data is greater, the value of the intermediate storage time-period T1 is smaller. The intermediate storage time-period T1 is represented by the following calculation formula (1) provided that $T1_{max}$ is the maximum value of the intermediate storage time-period T1, D is the data amount of the confidential print data, $D_o$ is the unit data amount, and $T_O$ is a subtracted period of time per unit data amount:

$$T1 = T1_{max} - T_O \times (D/D_O) \qquad (1)$$

In this example, a case is assumed in which the maximum value $T1_{max}$ of the intermediate storage time-period T1 is previously set to be 180(m) (m: minutes), the unit data amount $D_o$ is previously set to be 10(KB) (KB: kilo-byte), and the subtracted period of time $T_o$ per unit data amount $D_o$ is previously set to be 10(m). In such a case, for example, since "job 1" has a data amount of 200 KB, an intermediate storage time-period T1 for "job 1" is −20(m) in accordance with the above-described calculation formula (1). Note that in this example, the minimum value of the intermediate storage time-period T1 is set to be −60(m), and thus such jobs for which calculation result is not more than −60(m) are all made to have an intermediate storage time-period T1 of −60(m) (see FIG. 6B).

Next, intermediate storage time-period T2 is calculated for the respective confidential print data based on the elapsed time thereof. The intermediate storage time-period T2 is calculated by arranging pieces of the confidential print data in an descending order of long length of the elapsed time of the confidential print data (namely, a confidential print data having the longest elapsed time is arranged first) and by adding a predetermined period of time (predetermined duration of time) in the descending order of the long length of the elapsed time to a minimum value of the intermediate storage time-period T2. Namely, as the elapsed time of the confidential print data is shorter, the value of the intermediate storage time-period T2 is greater. The intermediate storage time-period T2 is represented by the following calculation expression (2) provided that $T2_{min}$ is the minimum value of the intermediate storage time-period T2, n is an order of a confidential print data among the pieces of confidential print data arranged in the descending order of the length of the elapsed time, and $T_P$ is the predetermined period of time:

$$T2 = T2_{min} + (n \times T_P) \qquad (2)$$

In this example, in a case that the minimum value $T2_{min}$ of the intermediate storage time-period T2 is previously set to be 0(m) and the predetermined period of time $T_P$ is previously set to be 30(m), the elapsed time becomes smaller in the order from "job 1" to "job 5". Accordingly, the intermediate storage time-periods T2 for the jobs 1 to 5 are 30(m), 60(m), 90(m), 120(m) and 150(m) respectively, in accordance with the above-described calculation formula (2) (see FIG. 6C).

Then, the intermediate storage time-periods T1 and T2 calculated in accordance with the calculation expressions (1) and (2) are added, and is weighted in accordance with the importance of the respective confidential print data to thereby calculate a final storage time-period T3 to be finally set for the respective confidential print data. Provided that the weight depending on the importance is W, the final storage time-period T3 is represented by the following calculation expression (3):

$$T3 = (T1+T2) \times W \qquad (3)$$

In this example, provided that the weight W is 1.2 for a case of "high importance", the weight W is 1.0 for a case of "medium importance", and the weight W is 0.5 for a case of "low importance", then for example the importance of "job 1" is "low" and thus the weight W for "job 1" is 0.5. Accordingly, the final storage time-period T3 for "job 1" is 5(m) in accordance with the above calculation formula (3). However, in this example, all the calculation results are rounded off, and the minimum value of the final storage time-period T3 is set to be 30(m). Accordingly, when the calculation results after the round-off are not more than 30(m), then such calculation results are all made to be 30(m) (see FIG. 6D).

With the above-described calculation formulae (1) to (3), the CPU 31 calculates the final storage time-periods T3 based on the attribute data of the respective confidential print data, and sets the calculated final storage time-periods T3 as the storage time-periods for the respective confidential print data in S109.

Note that although the combination of the respective data included in a plurality of pieces of the attribute data are used for the calculation of storage time-period in this embodiment, it is allowable to calculate the storage time-period based on any one of the plurality of pieces of the attribute data. For example, in a case of calculating the storage time-period based on the data amount (data size) of the confidential print data, the storage time-period is shorter as the data size is greater, thereby making it possible to reduce the burden to the storage area which would have otherwise caused due to a confidential print data having a large data size being stored for a long period of time without being printed. Alternatively, for example, in a case of calculating the storage time-period based on the elapsed time of the confidential print data, the storage time-period is shorter as the elapsed time is longer, thereby making it possible to reduce the burden to the storage area which would have otherwise caused due to a confidential print data being stored for a long period of time without being printed. Still alternatively, for example, in a case of calculating the storage time-period based on the importance of the confidential print data, the storage time-period is longer as the importance is greater, thereby making it possible to store important print data as long as possible.

As described above, according to the embodiment, in a case that the free space of the storage area storing the respective confidential print data is less than the predetermined threshold value, the storage time-period is set for the respective confidential print data; and the confidential print data stored in the storage area is not deleted until the storage time-period set for the confidential print data has elapsed. Accordingly, it is possible to store the received print data for a long period of time.

Further, since the confidential print data which has not been printed even after the elapse of the storage time-period is deleted, it is possible to reduce the burden to the storage area which would be otherwise caused due to such a confidential print data being stored for a long period of time, without being printed, even after elapse of the storage time-period.

Furthermore, in a case that the free space of the storage area is not less than the threshold value, the storage time-period set for the confidential print data is released or prolonged, thereby making it possible to store the received print data as long as possible.

Moreover, in a case that the free space of the storage area is less than the threshold value, the storage time-period set for the confidential print data is shortened, thereby making it possible to reduce the burden to the storage area which would be otherwise caused due to an unnecessary confidential print data being stored for a long period of time without being printed.

Further, it is possible to improve the usage efficiency of the storage area by setting the storage time-period appropriately based on the attribute data of the confidential print data.

Furthermore, the user is notified that process such as setting the storage time-period, etc. has been performed, thereby making it possible to urge the user to perform any process or handling according to the notified process.

Moreover, in a case that a newly received confidential print data is transmitted by the user who transmitted another confidential print data among pieces of stored confidential print data for which the storage time-period have been already set, the newly received confidential print data is deleted from the HDD, thereby making it possible to urge the user to take any action or handling for the earlier received confidential print data which has been transmitted by this user and which has been stored for a long period of time without being printed.

Note that the embodiment as described above is a mere example, and is not intended to limit the present teaching in any way. Accordingly, as a matter of course, the present teaching may be improved and/or modified in other various forms without deviating from the gist or essential characteristics of the present teaching. For example, the present teaching is not limited only to the printer, and is applicable to any apparatus or device provided at least with a printing function. Further, the image forming system of the process section 50 is not limited to those of the electro photography system, and may be those of the ink-jet system, as well. Furthermore, the set values in the calculation formulae (1) to (3) in the embodiment are merely examples, and may be changed as appropriate.

Further, in the embodiment, all the confidential print data (to be strict, all the confidential print data for each of which the storage time-period is set or all the confidential print data for each of which the storage time-period is not set) are handled as the object to be processed for which the setting, shortening, releasing and prolonging of the storage time-period are to be performed. However, it is allowable that a part of the confidential print data is made to be the object to be processed. For example, it is allowable to set the storage time-period only for a confidential print data which is included in the confidential print data and which is older than a predetermined time, based on the elapsed time of the attribute data.

Furthermore, in the above-described embodiment, the print data for which the storage time-period is set is a confidential print data for realizing the secure print function, the present teaching is not limit to this, and the print data may be a confidential print data for realizing a reprint function. A print data for reprinting is stored in the HDD 35 without being deleted even after the completion of printing, and can be printed when a reprint instruction is inputted by the user via the operation panel 40. Note that in a case of the print data for the reprint function, it is allowable that the password is not contained in the additional information data which is transmitted first. Accordingly, such print data for the reprint function can be printed by inputting only the user ID in S301 in FIG. 5B.

Moreover, in the embodiment, although the received confidential print data is stored in the HDD 35 of the printer 100, the confidential print data may be stored in the RAM 32 or the NVRAM 34 in a case of a printer which is not provided with the HDD 35. In such a case, it is allowable that the RAM 32 or the NVRAM 34 is provided with a confidential storage area for storing the confidential print data. For example, in S101 of FIG. 5A, a received confidential print data is temporarily stored in a non-confidential storage area which is different from the confidential storage area in the RAM 32 or the NVRAM 34; and in a case that "NO" judgment is given in S106, the confidential print data is moved to and stored in the confidential storage area. Further, in a case that the CPU 31 judges that the newly received confidential print data is transmitted by the user who has transmitted another confidential print data which is included in the confidential print data already stored and for which the storage time-period is set (S106: YES), the CPU 31 deletes the newly received confidential print data from the non-confidential storage area.

Further, in the processes in S105 and S204 of FIGS. 5A and 5B, the free space of the HDD 35 is judged in a case that the confidential print data has been newly stored and in a case that the confidential print data has been deleted, respectively. However, the present teaching is not limited to this; and it is allowable that the CPU 31 may constantly (always) check the free space of the HDD 35, or may be periodically check the free space at an appropriate time interval. Furthermore, it is allowable to use, as the information relating to the free space, an accumulation space (total data size with respect to the respective image data) or a ratio of the free space or the accumulation space to the total space of the HDD 35, instead of using the free space. By judging the accumulation space, the ratio of the free or accumulation space to the total space of the HDD 35, the free space of the HDD 35 is consequently judged.

Further, in the process in S108 of FIG. 5A, the CPU 31 calculates the storage time-period based on the attribute data of the respective confidential print data. It is allowable, however, to calculate the storage time-period based on the value of the free space. For example, it is allowable to calculate the storage time-period such that the storage time-period is longer as the free space is greater.

Moreover, in the processes in S112 and S206 of FIGS. 5A and 5B, the CPU 31 changes the storage time-period set for the respective confidential print data by a predetermined period of time previously determined. It is allowable, however, to re-calculate and set the storage time-period in a similar manner, based on the value of the free space. For example, it is allowable to re-calculate the storage time-period such that the storage time-period is longer as the free space is greater.

Further, with respect to the confidential print data in the embodiment, it is allowable to combine (collectively handle) the attribute data and the additional information data, as a data associated with one piece of image data.

Furthermore, regarding the confidential print data in the embodiment, it is allowable to store the image data in the HDD 35 and to store the attribute data and the additional information data in any of the ROM 32, the RAM 33 and the NVRAM 34. In such a case, it is allowable to prepare a table correlating the image data with the attribute data and additional information data.

Note that in the embodiment, the user is authenticated by inputting the user ID and the password as the print instruction via the operation panel 40 of the printer 100. However, the method for authenticating the user and inputting the print instruction is not limited to this. For example, it is allowable to authenticate the user and input the print instruction in such a manner that a card reader (input section) is connected to the printer 100 and the user causes the card reader to read an IC card in which the user ID and the password of the user are stored.

Note that in the embodiment, in a case that when the CPU 31 judges that a newly received confidential print data and a stored confidential print data, among the pieces of confidential print data already stored in the HDD 35, for which the storage time-period has been set, are transmitted by a same user (S106: YES), the CPU 31 causes the newly received confidential print data to be deleted from the HDD 35 as a penalty processing (S107). However, the process of judging whether or not a newly received confidential print data and a stored confidential print data, among the pieces of confidential print data already stored in the HDD 35, for which the storage time-period has been set, are transmitted by a same user (S106) and the process of deleting the newly received confidential print data (S107) are not necessarily indispensable. In such a case, it is allowable to calculate the storage time-period, within which a confidential print data can be stored in the HDD 35, for pieces of confidential print data stored in the HDD 35 and for which the storage time-period has not been set yet, based on the attribution data of the respective confidential print data (S108), regardless of whether or not the newly received confidential print data and the stored confidential print data, among the pieces of confidential print data already stored in the HDD 35, for which the storage time-period has been set, are transmitted by a same user.

What is claimed is:

1. A printing apparatus which is connected to an external apparatus and which performs printing of an image on a recording medium, the printing apparatus comprising:
   a receiving section which receives a print data from the external apparatus;
   a storage section in which the print data received by the receiving section is stored;
   an input section which receives a print instruction from a user for printing based on the print data stored in the storage section;
   a print section which performs the printing of the image on the recording medium based on the print data stored in the storage section in a case that the input section receives the print instruction from the user; and
   a controller which controls the storage section and which calculates and sets for the print data stored in the storage section a storage time-period within which the print data is storable in the storage section;
   wherein: under the condition that the receiving section receives the print data, the controller calculates a free capacity of the storage section;
   in a case that the free capacity of the storage section is less than a predetermined reference value, the controller calculates and sets the storage time-period for first print data which is stored in the storage section and for which the storage time-period has not been set; and in a case that the storage time-period set for the first print data has elapsed, the controller controls the storage section to delete the first print data stored in the storage section from the storage section.

2. The printing apparatus according to claim 1, wherein after the controller controls the storage section to delete the first print data from the storage section, the controller calculates the free capacity of the storage section again; and in a case that the free capacity of the storage section calculated by the controller again is not less than the predetermined reference value, the controller releases or prolongs the storage time-period set for second print data which is stored in the storage section and for which the storage time-period has been set.

3. The printing apparatus according to claim 2, wherein after the controller releases or prolongs the storage time-period set for the second print data, the controller notifies the external apparatus from which the second print data has been received that the storage time-period set for the second print data has been released or prolonged.

4. The printing apparatus according to claim 1, wherein in a case that the free capacity of the storage section is less than the predetermined reference value, the controller further shortens the storage time-period set for the second print data which is stored in the storage section and for which the storage time-period has been set.

5. The printing apparatus according to claim 4, wherein after the controller shortens the storage time-period set for the second print data, the controller notifies the external apparatus from which the second print data has been received that the storage time-period set for the second print data has been shortened.

6. The printing apparatus according to claim 1, wherein the print data has an attribute data indicating attribute of the print data; and the controller calculates and sets the storage time-period for the first print data based on the attribute data of the first print data.

7. The printing apparatus according to claim 6, wherein the attribute data includes at least one of a data amount of the print data, importance of the print data, and an elapsed time elapsed since receipt of the print data.

8. The printing apparatus according to claim 1, wherein after the controller calculates and sets the storage time-period for the first print data, the controller notifies the external apparatus from which the first print data has been received that the storage time-period has been set for the first print data.

9. The printing apparatus according to claim 8, wherein after the controller controls the storage section to delete the first print data from the storage section, the controller further notifies the external apparatus from which the first print data has been received that the first print data has been deleted from the storage section.

10. The printing apparatus according to claim 1, wherein the print data further includes a user ID of the user from whom the print instruction is received; and in a case that the user ID included in the print data received by the receiving section is same as that included in second print data which is stored in the storage section and for which the storage time-period has been set, the controller controls the storage section to delete the print data received by the receiving section from the storage section.

* * * * *